United States Patent
Smith et al.

(10) Patent No.: US 7,871,043 B2
(45) Date of Patent: Jan. 18, 2011

(54) METHOD FOR PARACHUTE REEFING CONTROL

(75) Inventors: John J. Smith, Middlefield, CT (US); Allen C. Witkowski, Lebanon, CT (US)

(73) Assignee: Pioneer Aerospace Corporation, South Windsor, CT (US)

( * ) Notice: Subject to any disclaimer, the term of this patent is extended or adjusted under 35 U.S.C. 154(b) by 0 days.

(21) Appl. No.: 12/660,207

(22) Filed: Feb. 23, 2010

(65) Prior Publication Data

US 2010/0187363 A1 Jul. 29, 2010

Related U.S. Application Data

(62) Division of application No. 11/414,677, filed on Apr. 28, 2006, now Pat. No. 7,703,720.

(51) Int. Cl.
*B64D 17/62* (2006.01)
(52) U.S. Cl. ............... 244/152; 244/150; 102/387
(58) Field of Classification Search ............... 244/142, 244/146, 147, 149, 150, 152, 137.3, 138 R; 102/387; 446/49
See application file for complete search history.

(56) References Cited

U.S. PATENT DOCUMENTS

| | | | |
|---|---|---|---|
| 2,427,979 A | 9/1947 | Sorensen | |
| 2,490,844 A | 12/1949 | Sorensen | |
| 2,570,295 A * | 10/1951 | Vantine, Jr | 244/150 |
| 2,925,234 A | 2/1960 | Wodal et al. | |
| 2,966,316 A | 12/1960 | Ward et al. | |
| 3,146,946 A | 9/1964 | Houdou | |
| 3,193,223 A | 7/1965 | Davis | |
| 3,204,368 A | 9/1965 | Effinger, Jr. et al. | |
| 3,443,779 A | 5/1969 | Rogallo et al. | |
| 3,920,201 A | 11/1975 | Battles | |
| 4,175,722 A | 11/1979 | Higgins | |
| 4,180,221 A | 12/1979 | Harris | |
| 4,440,366 A | 4/1984 | Keeler et al. | |
| 4,601,443 A | 7/1986 | Jones et al. | |
| 4,603,823 A * | 8/1986 | Ayoub | 244/122 AE |
| 4,865,274 A | 9/1989 | Fisher | |
| 4,934,630 A | 6/1990 | Snyder | |
| 4,948,071 A | 8/1990 | Summers, III | |
| 4,955,563 A | 9/1990 | Lee et al. | |
| 5,080,305 A | 1/1992 | Stencel et al. | |
| 5,160,100 A | 11/1992 | Snyder | |
| 5,620,153 A | 4/1997 | Ginsberg | |
| 5,678,788 A | 10/1997 | Hetzer et al. | |
| 6,042,056 A | 3/2000 | Chopard | |
| 6,293,202 B1 | 9/2001 | Woodall et al. | |

(Continued)

*Primary Examiner*—Benjamin P Lee
(74) *Attorney, Agent, or Firm*—Sperry, Zoda & Kane

(57) ABSTRACT

A method for controlling the drag area growth of a parachute canopy during airborne descent with sensors attached to the payload for facilitating modification of the schedule of release of a parachute canopy reefing mechanism. A control processor is included that can receive and/or calculate a schedule for disengaging the reefing on the parachute. One or more wireless transmitters at the payload transmit the releasing signal from the payload to the reefing mechanism normally located adjacent the parachute canopy. The control processor can also be configured to receive input information from multiple sensors attached to the payload that monitor parameters such as altitude, position, load force, dynamic pressure, time and others to facilitate instantaneous recalculation of the disreefing schedule responsive to such conditions.

9 Claims, 1 Drawing Sheet

U.S. PATENT DOCUMENTS

| | | |
|---|---|---|
| 6,299,104 B1 * | 10/2001 | El-Sherif et al. ............ 244/142 |
| 6,322,021 B1 | 11/2001 | Fisher et al. |
| 6,343,244 B1 | 1/2002 | Yoneda et al. |
| 6,364,251 B1 | 4/2002 | Yim |
| 6,416,019 B1 | 7/2002 | Hilliard et al. |
| 6,503,119 B1 | 1/2003 | Lapointe |
| 6,505,793 B2 | 1/2003 | Schwarzler |
| 6,587,762 B1 | 7/2003 | Rooney |
| 6,622,968 B1 | 9/2003 | St. Clair et al. |
| 6,676,084 B2 | 1/2004 | Asseline et al. |
| 6,830,222 B1 | 12/2004 | Nock et al. |
| 6,845,948 B2 | 1/2005 | Thomas |
| 6,877,690 B1 | 4/2005 | Bragg |
| 6,889,942 B2 | 5/2005 | Preston |
| 6,923,404 B1 | 8/2005 | Liu et al. |
| 7,059,570 B2 * | 6/2006 | Strong ........................ 244/147 |
| 2003/0164426 A1 | 9/2003 | St. Clair |
| 2005/0230555 A1 * | 10/2005 | Strong ........................ 244/152 |
| 2007/0075189 A1 * | 4/2007 | Lee ............................ 244/147 |
| 2009/0026319 A1 * | 1/2009 | Strong ........................ 244/152 |

* cited by examiner

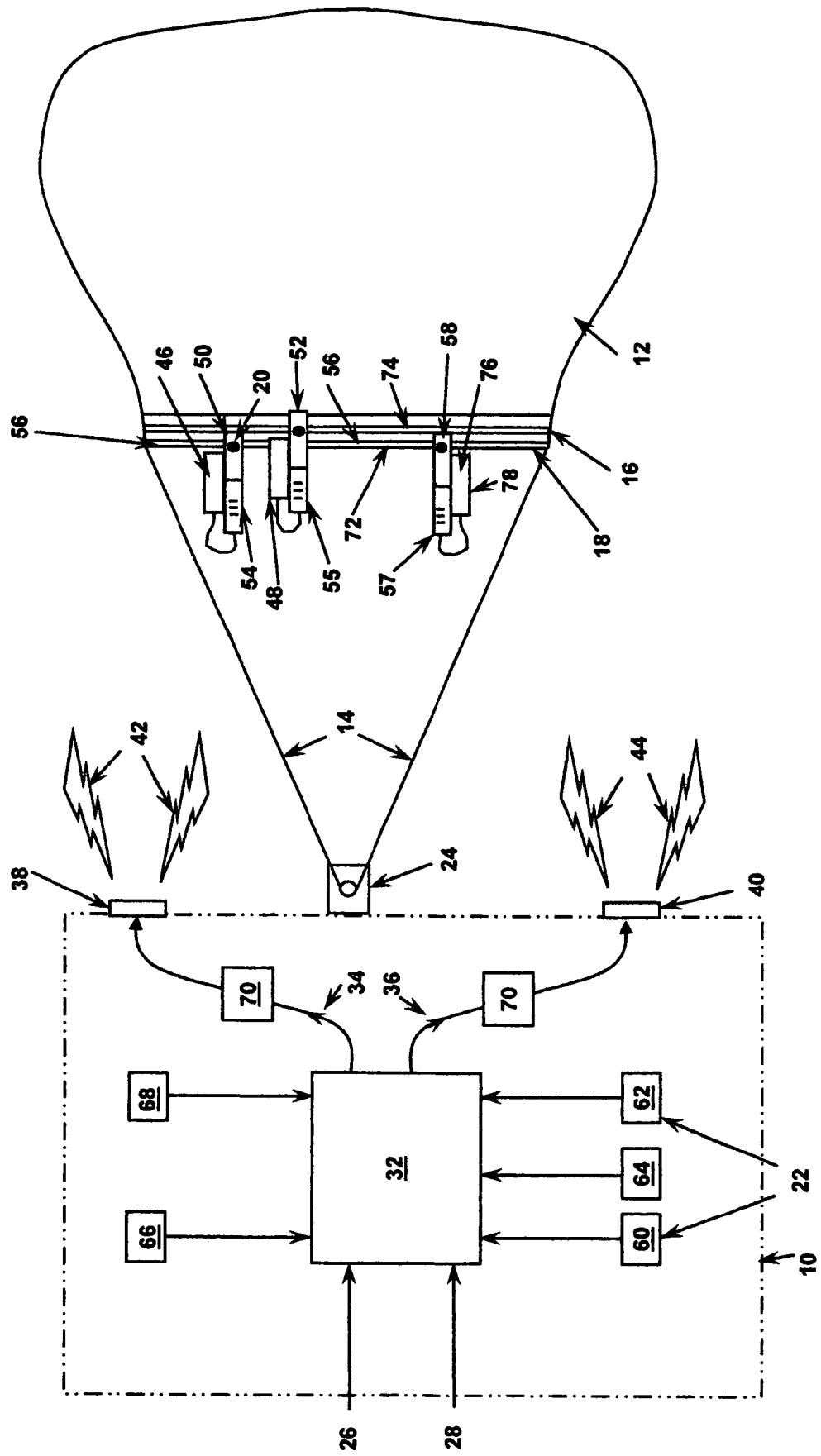

METHOD FOR PARACHUTE REEFING CONTROL

This application is a division of and claims filing priority of U.S. patent application Ser. No. 11/414,677 filed Apr. 28, 2006 now U.S. Pat. No. 7,703,720 by the same inventors as set forth herewithin, currently pending and assigned to Pioneer Aerospace Corporation.

BACKGROUND OF THE INVENTION

1. Field of the Invention

The present invention deals with the field of airborne descent control devices such as parachutes and other gliding wing constructions which are attached to payloads therebeneath such as capsules used for return of individuals or equipment from space travel. Such parachute devices normally need to be reefed in order to restrict or at least control the inflation of the canopy thereof in order to assure a gradual properly formed movement of the canopy from the fully collapsed position within the parachute pack prior to deployment to the fully inflated position. Often multiple stages of such reefing are utilized in order to assure that the canopy gradually moves from the closed position to the fully inflated position to avoid excessive loads or the exposure thereof to improper inflation forces which might damage or otherwise inhibit the full canopy inflation.

Most parachute reefing is accomplished with a continuous line that is installed in the parachute skirt or mouth or lower surface and then is cut at a discrete time which is predetermined on the basis of load limitations and other aerodynamic considerations. Often mechanically actuated pyrotechnic reefing cutters are used for cutting this line. Normally these cutters are present with a specific time delay and cannot be adjusted for different conditions after installation or packing.

It should be appreciated that parachute reefing can occur in several multiple stages from one or two stages to as many as five stages or more. Reefing is used primarily for controlling the forces of canopy inflation. If a reefing line fails or if a reefing cutter operates prematurely, the canopy inflation can exceed design force levels. If a reefing line is not completely severed or if a cutter fails to operate, the canopy will not reach full inflation and excessive descent rates and/or ground impacts can result. Redundant cutters and cutter activation signals herein are intended to provide back-up operation to this critical function. Also included within the present invention is an inhibiting feature to prevent disreefing beyond certain conditions.

2. Description of the Prior Art

Some parachutes which are used for controlling airborne descent of payloads include electrically actuated pyrotechnic reefing cutters which allow an electrical signal to provide flexibility and optimum performance. However, because the reefing cutters must be installed on the parachute skirt for proper inflation control, these electrical cables can become excessively heavy and risky to the reliability of operation of the parachute due to the length and necessary slack of the fairly heavy electrical cable. The present invention provides a unique means for controlling the disengagement of the reefing in one or multiple stages of such a parachute canopy. Parameters monitored by sensors on the payload are used to trigger the reefing disengagement mechanism located at the parachute skirt without requiring any such electrical cables. Some patents have been granted on remotely positioned control devices for parachutes all of which are significantly different from the present invention such as U.S. Pat. No. 2,427,979 patented Sep. 23, 1947 to A. J. Sorensen and assigned to The Union Switch & Signal Company on a "Communication And Control System For Airplanes"; and U.S. Pat. No. 2,490,844 patented Dec. 13, 1949 to E. M. Sorensen on a "Radio Remote-Control Aircraft System"; and U.S. Pat. No. 2,925,234 patented Feb. 16, 1960 to F. A. Wodal et at and assigned to Earle W. Wallick and Temple N. Joyce on an "Aircraft Remote Proportional Control Mechanism"; and U.S. Pat. No. 2,966,316 patented Dec. 27, 1960 to N. E. Ward et al and assigned to the United States of America as represented by the Secretary of the Navy on a "Missile"; and U.S. Pat. No. 3,146,976 patented Sep. 1, 1964 to M. J. Houdou on a "Parachute"; and U.S. Pat. No. 3,193,223 patented Jul. 6, 1965 to S. Davis on a "Parachute Release Control"; and U.S. Pat. No. 3,204,368 patented Sep. 7, 1965 to W. L. Effinger, Jr. et al and assigned to The A.C. Gilbert Company on a "Self-Powered Model Paraglider"; and U.S. Pat. No. 3,443,779 patented May 13, 1969 to F. M. Rogallo et al and assigned to the United States of America as represented by the Administrator of National Aeronautics and Space Administration; on "Aeroflexible Structures"; and U.S. Pat. No. 3,920,201 patented Nov. 18, 1975 to W. R. Battles on a "Pilotless Glider Construction"; and U.S. Pat. No. 4,175,722 patented Nov. 27, 1979 to M. W. Higgins on a "Control System For Ram Air Gliding Parachute"; and U.S. Pat. No. 4,180,221 patented Dec. 25, 1979 to D. E. Harris on a "Self Propelled Kite"; and U.S. Pat. No. 4,440,366 patented Apr. 3, 1984 to A. A. Keeler et al and assigned to Commonwealth of Australia on a "Parachute Control Apparatus"; and U.S. Pat. No. 4,601,443 patented Jul. 22, 1986 to A. W. Jones on a "Free Flyable Structure"; and U.S. Pat. No. 4,865,274 patented Sep. 12, 1989 to J. A. Fisher and assigned to United Technologies Corporation on a "Passive Control Assembly For Gliding Device"; and U.S. Pat. No. 4,934,630 patented Jun. 19, 1990 to S. L. Snyder on a "Powered Airfoil Canopy Aircraft"; and U.S. Pat. No. 4,948,071 patented to C. M. Summers on Aug. 14, 1990 on a "Deployment System For Parachute"; and U.S. Pat. No. 4,955,563 patented Sep. 11, 1990 to C. K. Lee et al and assigned to the United States of America as represented by the Secretary of the Army on an "Apparatus And Method For Controlled Simultaneous Opening Of Clustered Parachutes"; and U.S. Pat. No. 5,080,305 patented Jan. 14, 1992 to F. B. Stencel on a "Low-Altitude Retro-Rocket Load Landing System With Wind Drift Counteraction"; and U.S. Pat. No. 5,160,100 patented to S. s L. Synder on Nov. 3, 1992 on an "Airfoil Canopy Aircraft"; and U.S. Pat. No. 5,620,153 patented Apr. 15, 1997 to H. M. Ginsberg on a "Light Aircraft With Inflatable Parachute Wing Propelled By A Ducted Propeller"; and U.S. Pat. No. 5,678,788 patented Oct. 21, 1997 to W. Hetzer et al and assigned to Daimler-Benz Aerospace AG on a "Steering Device For A Glider"; and U.S. Pat. No. 6,042,056 patented Mar. 28, 2000 to J. P Chopard and assigned to Delegation Generale pour l'Armement on an "Air Carrier Steerage Control Device"; and U.S. Pat. No. 6,293,202 patented Sep. 25, 2001 to R. Woodall et al and assigned to The United States of America as represented by the Secretary of the Navy on a "Precision, Airborne Deployed, GPS Guided Standoff Torpedo"; and U.S. Pat. No. 6,322,021 patented Nov. 27, 2001 to J. A. Fisher et al and assigned to Advanced Systems Technology, Inc. on a "Deployable Wing With Propulsion For Range Extension"; and U.S. Pat. No. 6,343,244 patented Jan. 29, 2002 to H. Yoneda et al and assigned to Fuji Jukogyo Kabushiki Kaisha on an "Automatic Guidance System For Flight Vehicle Having Parafoil And Navigation Guidance Apparatus For The System"; and U.S. Pat. No. 6,364,251 patented Apr. 2, 2002 to J. H. Him on an "Airwing Structure"; and U.S. Pat. No. 6,416,019 patented Jul. 9, 2002 to D. P. Hilliard et al and assigned to The United States of America as represented by the Secretary of the Navy on a "Precision Parachute Recovery System"; and U.S. Pat. No. 6,503,119 patented to B. K. Lapointe on Jan. 7, 2003 on a "Parachute Toy"; and U.S. Pat. No. 6,505,793 patented Jan. 14, 2003 to H. J. Schwarzler and assigned to EADS Deutschland GmbH on an "Actuation System And Method For A Load-Bearing Paraglider"; and U.S. Pat. No. 6,587,762 patented Jul. 1, 2003 to H. B. Rooney and assigned to FXC Corporation on an "Automatic Guidance Unit For Aerial Delivery Unit"; and U.S. Pat. No. 6,622,968 patented Sep. 23, 2003 to D. S. Clair et al and assigned to Edward Strong on a "Guided Airborne Vehicle, Cargo And Personnel Delivery System"; and U.S. Pat. No. 6,676,084 patented Jan. 13, 2004 to J. Asseline et al and assigned to Institut de Recherche pour le Developpement on a "Small-Sized Radio-Controlled Flying Device"; and U.S. Pat. No. 6,830,222 patented to K. T. Nock et al on Dec. 14, 2004 and assigned to Global Aerospace Corporation on a "Balloon Device For Lowering Space Object Orbits"; and U.S. Pat. No. 6,845,948 patented Jan. 25, 2005 to P. J. Thomas and assigned to Paul J. Thomas on an "Adaptable Kite/Airfoil"; and U.S. Pat. No. 6,877,690 patented Apr. 12, 2005 to A. J. Bragg on a "Combination Powered Parachute And Motorcycle"; and U.S. Pat. No. 6,889,942 patented May 10, 2005 to D. Preston and assigned to Atair Aerospace, Inc. on a "Steerable Parachute Control System And Method"; and U.S. Pat. No. 6,923,404 patented Aug. 2, 2005 to D. D. Liu et al and assigned to ZONA Technology, Inc. on an "Apparatus And Methods For Variable Sweep Body Conformal Wring With Application To Projectiles, Missiles, And Unmanned Air Vehicles"; and United States Patent Publication No. US 2003/0164426 A1 to D. St. Clair et al on a "Guided Airborne Vehicle, Cargo And Personnel Delivery System".

SUMMARY OF THE INVENTION

The present invention provides a unique method and apparatus for parachute reefing control which is usable with a payload attached solely through suspension lines to a parachute having a canopy and a multiply staged canopy reefing device and a reefing release mechanism for controlling canopy inflation and airborne descent after deployment. The parachute reefing control apparatus may include a plurality of sensors mounted with respect to the payload for monitoring parameters to facilitate determination of a release schedule for disengaging the reefing of the parachute canopy. The sensing mechanism can include a mission time clock which monitors the time elapsed since deployment of the parachute and the payload. The sensing devices can also include a global positioning system device for the purpose of instantaneously monitoring the position of the payload relative to the earth therebelow and to facilitate more precision in determining the location of landing of the parachute. With ongoing GPS monitoring, it is possible to disreef the parachute at the optimal altitude to account for wind drift and, in this manner, minimize the distance from a landing target. Furthermore the sensor array can include a pressure sensing mechanism for monitoring the dynamic pressure being exerted instantaneously on the payload. Also a load sensing means can be included in the sensing array for the purpose of sensing the load force of the canopy. Other conditions can be monitored for the purpose of providing information for determining continuously and instantaneously on an ongoing basis what the release profile or release schedule should be for the disengagement of the reefing mechanism for the canopy of the parachute.

A reefing control processor is also included which is mounted with respect to the payload and is operatively connected to the sensing means for receiving information on all the parameters sensed by the sensing array in order to utilize this to calculate a release schedule. This release schedule will generate one or more release signals which are operable to initiate disengagement of all or part of the reefing mechanism. A wireless transmitter means is also included mounted with respect to the payload and operatively connected to the reefing control processor. This wireless transmitter is responsive to receiving release signals from the reefing control means to transmit a wireless signal therefrom.

Further included in the present invention is a wireless receiver means attached with respect to the parachute canopy which is operative to be actuated responsive to sensing the generation of a wireless signal by the wireless transmitter to initiate operation of the reefing release mechanism. Normally this reefing release mechanism can include more than one individual stage and, as such, the wireless receiver will be responsive to receiving the individual wireless signals from the wireless transmitter to disengage each canopy reefing stage sequentially. When utilizing more than one stage the initial stage will allow partial inflation of the canopy by partial disreefing thereof and complete reefing will follow in the second or subsequent stages until full disengagement of the reefing mechanism is achieved which will then allow full inflation of the canopy.

The apparatus of the present invention can also include a parachute deployment inhibiting mechanism which is attached to the payload and is operatively positioned between the reefing control processor and the wireless transmitter to prevent deployment of the parachute unless all parameters being monitored by the sensing means are within predefined tolerance value limitations.

The apparatus of the present invention can also include a first signal and an additional signal wherein the second signal is a redundant backup signal to insure that full disreefing has occurred. The canopy release device preferably includes at least one line extending around the canopy such as to restrict parachute canopy inflation. Furthermore the reefing release mechanism further includes at least one electrically-fired cutter positioned adjacent to the line for cutting thereof responsive to actuation of the reefing release mechanism.

It should be further appreciated that the method of the present invention can be practiced in such a manner as to not require any direct connection between the payload and the parachute other than through solely the conventional suspension lines extending from the canopy to the payload. This is achieved by monitoring a plurality of parameters with a sensor array which is mounted on the payload. Thereafter a reefing control processor is provided mounted on the payload which continuously receives information on the monitored parameters from the sensor for instantaneously determining a release schedule for the reefing of the parachute canopy. Thereafter at least one wireless signal is transmitted from the payload to the reefing release mechanism mounted adjacent the reefing device at the parachute canopy. This signal is received at the canopy to facilitate actuation of a reefing release mechanism positioned adjacent to the canopy and preferably adjacent to the skirt of the canopy to allow at least partial inflation of the parachute canopy to facilitate control descent thereof with the payload attached thereto. If additional stages of reefing need to be disengaged then additional wireless signals can be generated by the reefing control processor and transmitted to the wireless receiver attached adjacent to the reefing release mechanism. In this manner once the final reefing is disengaged the canopy will be capable of full inflation to efficiently and effectively control airborne descent of the payload.

It is an object of the method for parachute reefing control of the present invention to provide a smart reefing system responsive to continuously monitor parameters for fast and yet efficient full inflation of a parachute canopy.

It is an object of the method for parachute reefing control of the present invention to provide a system which can quickly respond to real time changes in mission profile such as aborted missions and high winds and other unusual circumstances.

It is an object of the method for parachute reefing control of the present invention to provide the use of wireless technology including a wireless transmitter and a wireless receiver to preferably electrically initiate pyrotechnic cutters rigged on traditional reefing lines within the canopy.

It is an object of the method for parachute reefing control of the present invention to provide a control processor which receives sensory input from load, altitude, mission time, pressure sensors and other parameters to determine the best time to operate the reefing release mechanism without requiring any physical connection for the control between the payload and the parachute.

It is an object of the method for parachute reefing control of the present invention to provide a system which increases mission profile flexibility by building in known mission profiles that could be commanded by either a crew or a vehicle's flight computer.

It is an object of the method for parachute reefing control of the present invention to provide a system which would not need to be over built to suit off nominal mission profile requirements.

It is an object of the method for parachute reefing control of the present invention to provide a system which could utilize small power supplies installed adjacent to each electrically fired reefing cutter.

It is an object of the method for parachute reefing control of the present invention to provide a system which allows for controlling operation of the reefing disengagement means to be mounted on the payload and to be continuously and instantaneously responsive to sensed conditions ongoing.

It is an object of the method for parachute reefing control of the present invention to provide a system which allows for controlling operation of the reefing disengagement means of multiple parachutes which are all connected to the same payload, commonly known as a cluster of parachutes, and, wherein each of these parachutes are disreefed in a coordinated manner to facilitate uniform canopy inflation among all parachutes in the cluster.

BRIEF DESCRIPTION OF THE DRAWING

While the invention is particularly pointed out and distinctly claimed in the concluding portions herein, a preferred embodiment is set forth in the following detailed description which may be best understood when read in connection with the accompanying drawing, in which:

The FIGURE shows a schematic illustration of an embodiment of the method and apparatus for parachute reefing control of the present invention.

DETAILED DESCRIPTION OF THE PREFERRED EMBODIMENT

The present invention provides an apparatus for parachute reefing control which includes a vehicle or payload 10 such as a space capsule which includes a parachute 16 attached thereto. Both the payload 10 and the parachute 16 are shown schematically in the FIGURE of the present invention. The parachute 16 includes a canopy 12 which is initially collapsed or packed and is reefed to restrict inflation thereof such that that movement toward the fully inflated state can be controlled. A plurality of suspension lines 14 extend from the canopy 12 of parachute 16 to the payload 10. In one common usage of the apparatus of the present invention is where the payload 10 is a space travel capsule is returning from a mission wherein control of airborne descent thereof is provided by the parachute 16 or a cluster of such parachutes.

In the present invention a canopy reefing device 18 is shown schematically in the FIGURE extending around the lower surface or edge of the canopy 12 in order to selectively restrict inflation thereof until released. A reefing release mechanism 20 is also shown which may include one or more individual reefing release devices. As shown in the FIGURE, the first reefing release device 54 and the back up first reefing release device 57 are shown surrounding a reefing line 56, or more particularly, extending around the first reefing line 72, which restricts inflation of the canopy 12 until released.

Thus, when the first reefing release device 54 is activated it will cut the first line 72 in order to at least partially release the canopy 12. The first reefing release device 54 can also be provided with a backup or redundant device to be operable to cut first reefing line 72. The backup first reefing release device 57 provides this redundancy to assure that disreefing occurs despite any possible failure associated with the first reefing release device 54. Such a back up system may also require a backup reefing release means 78 and a backup wireless receiver 76.

Normally multiple stages of reefing of the canopy are provided and, as such, multiple reefing release devices are required to fully release the canopy to the full inflation. Such additional reefing release devices can be included such as second reefing release device 55. This device 55 is shown in the FIGURE herein surrounding a second reefing line 74 to facilitate cutting thereof for disreefing the second stage of canopy reefing. It should also be appreciated that the present invention can be practiced with any number of different stages incorporated into the reefing release mechanism 20. Use of as many as five or more stages is fairly common in some applications. Such reefing is shown schematically in the FIGURE wherein one frangible line 56 will usually be installed on the canopy skirt for each stage of reefing. In the FIGURE a first reefing line 72 and a second reefing line 74 are shown, as an example of two stage reefing but many others could be included, often configured with various sized lengths to facilitate staging of the reefing. Multiple stages of reefing configuration would normally be achieved by providing multiple independent reefing lines of successively increasing lengths for allowing the canopy to inflate in progressive stages to full inflation.

One of the unique optional aspects of the present invention is in the use of a plurality or array of sensing devices 22 which are mounted with respect to the payload 10. The sensing devices 22 are for the purposes of continuously monitoring various conditions or parameters in an ongoing basis and providing this information to a reefing control processor 32 which normally is a digital device such as a computer. The reefing control processor 32 is operable to monitor the initially provided mission profile or reefing release schedule based upon the input from the various sensors in the array 22. As shown in the schematic diagram of the present invention, the initial mission profile 28 is set prior to deployment of the parachute. This initial mission profile for release of the reefing mechanism can be modified by the control logic in the reefing control processor 32 in the continuous ongoing feedback basis based upon the information received from the various sensors in the array 22.

The sensor array 22 can include a mission time clock 60. It also can include an altitude sensor 62. A global positioning system device 64 can be another sensor included on the sensing array 22. Sensing array 22 can further include a pressure sensing means which monitors the dynamic pressure being exerted instantaneously on the payload. Another possible parameter to be sensed by array 22 is the load force of the canopy. Each of these parameters as well as other parameters which could be included and are still within the contemplation of the present invention will be continuously monitored in order to provide updated and current information to the reefing control processor 32 for the purpose of allowing the control processor through predetermined algorithms to modify the schedule or profile of actuation of the reefing release mechanism 20. With this construction the release profile can be modified even at the very last split second prior to initiation of operation of the reefing release mechanism 20.

It should be appreciated that the use of the array of sensors is an important optional aspect of the present invention but is not required in order to practice the basic concept. The reefing control processor will be initially programmed with one or more basic reefing release schedule. The processor can be preprogrammed with several choices of schedules, each of which is usable for different specific applications. Choice of the schedule or the programming of a customized schedule is facilitated because the reefing control processor is attached to the payload and is not packed within the parachute pack. Thus, the program can be chosen even after the parachute is completely packed.

The reefing control processor can contain only a simple timetable which will be set by an operator prior to use without requiring any input from any sensors. Thus the concept of the present invention allows for multiple and repeated use of a common parachute system across various mission profiles. It is very simple and easy to make modifications to any predefined disreefing schedule at the payload where the processor is located and at a time after the common parachute system has already been packed for use. Of course, the inclusion of the array of sensors with the input directed to the processor does provide a system which is adaptable to vary the disreefing schedule responsive to contemporaneous changes in flight conditions. The predesignated timetables for disreefing would also provide the reefing control processor with backup disreefing control timetables in those situations where the sensors fail to properly monitor flight conditions or fail to communicate their reading to the processor.

The profile or schedule determined by the reefing control processor 32 will be operative to generate one or more release signals such as first release signal 34 and/or second release signal 36. At least one such release signal will be required in all operations and, in this embodiment, the first release signal 34 will then be communicated to the primary wireless transmitter 38. This primary wireless transmitter 38 will then generate a primary wireless signal. It is important to appreciate that the reefing control processor 32 as well as the primary wireless transmitter 38 and any other wireless transmitter utilized with the apparatus of the present invention is attached with respect to the payload. In this example the primary wireless transmitter 38 will generate this primary wireless signal 42 which is adapted to be received by a primary wireless receiver 46 which is mounted with respect to the parachute. Preferably the primary wireless receiver 46 will be positioned immediately adjacent to the first stage reefing device 50 which in this case is shown as an electrically activated pyrotechnically fired cutter. As shown in the FIGURE of the present invention the first stage reefing means and the backup first stage reefing means are both shown in surrounding engagement to the first stage reefing line 72 surrounding the canopy and shown schematically in the FIGURE. Each is positioned immediately adjacent to a reefing release device. The first reefing release device 54 is positioned immediately adjacent to the first stage reefing means 50 and is operable for release thereof. Preferably the first reefing release device 54 will achieve partial or full disengagement of the canopy reefing device 18 but surely will achieve at least full releasing of the first stage reefing 50.

Similarly the second reefing release device 55 is shown immediately adjacent to the second stage reefing means 52. The second reefing release device 55 is operative responsive to receiving a secondary wireless signal 44 transmitted by a secondary wireless transmitter 40 attached to the payload 10 in order to initiate operation of the second reefing release device 55.

It is an important consideration of the present invention to realize that the primary wireless transmitter 38 and the secondary wireless transmitter 40 will generate a primary wireless signal 42 and a secondary wireless signal 44 such as to be sensed by the primary wireless receiver 46 and, respectively, the secondary wireless receiver 48 and initiate operation, respectively, of the first reefing release device 54 and the second reefing release device 55. It is also important to realize that the second reefing release device 55 can be constructed to release a second stage of reefing of the canopy. A backup release mechanism can also be provided for any or all of the stages to be assured that the main reefing release device for that stage works properly. It is also possible that more than two stages of disreefing may be required.

In utilizing the apparatus of the present invention, it is important to note that the only means of connection between the canopy 12 and the payload 10 is through the suspension lines 14. These suspension lines extend toward the payload and are attached to the payload at an attachment point 24 as shown schematically in the FIGURE. Commonly the actual attachment between the suspension lines and the payload is through another physical means such as a riser or bridle. There is no need for any electrical lines or other hard wire communication between the payload 10 and the canopy 12 because the signal for initiation of operation of the reefing release mechanism 20 is provided by wireless transmitters and receivers as well as a continuously automatically adjustable reefing control processor 32. The processor 32 should preferably include its own separate processor power supply 26.

Two of the important sensors in the array of sensors 22 include the load force sensor 66 and the dynamic pressure sensor 68. Each of these sensors monitor ongoing conditions which are very important in order to determine the proper time for disengagement of the canopy reefing. By positioning the primary wireless receiver 46 and, if needed, the secondary wireless receiver 48 in a position mounted on a canopy whereas the transmitters 38 and 40 are mounted on the payload, a physical disengagement between the payload and the electrically controlled operating means for disreefing in the canopy is provided. This is important since any such additional interconnections can often lead to improper loads or entanglements or other problems which can be of critical importance in the midst of a rapid airborne descent of a payload and parachute apparatus.

A parachute deployment inhibiting device 70 can also be included operatively positioned between the reefing control processor and the wireless transmitters 38 and 40 in order to prevent deployment and/or disreefing of the parachute unless the flight conditions are deemed acceptable as determined by the parameters being monitored by the array of sensing means which must be within predetermined tolerance limitations. It is also noted that in the preferred configuration, the configuration of the reefing mechanism includes at least one restricting line 56 which preferably can be cut by at least one electrically fired cutter 58. However, other means of restricting the canopy are provided and other means of releasing the reefing mechanism can also be contemplated and still be within the metes and bounds of the present invention.

It is important to consider that the present invention provides a means for mounting a plurality of sensors and a reefing disengagement profile controller mounted to the payload rather than to the parachute. The parachutes are normally initially packed and, as such, access to controlling therewithin are severely restricted after packing. With the use of the apparatus of the present invention the sensors are mounted to the payload and the reefing control processor is also mounted on the payload and wirelessly transmits information regarding reefing release to the canopy. As such, those controls are external to the parachute when packed and are available for setting of the mission profile input or modifying of the algorithms in the reefing control processor 32 as needed even after the parachute canopy and suspension lines are completely packed. This added flexibility greatly enhances operational control of the canopy deployment.

The apparatus of the present invention also allows parachute reefing to be sequenced at optimal times in order to achieve a degree of trajectory control and in this manner further enhance the possibility of precise landings. Also, in the very unusual emergency circumstances, it may be needed to have a very short reefing delay. The system of the present invention allows for prompt inflation when the system is deployed at a low altitude or at low air speed while also allowing the system to be adaptable to obtain extended reefing delay and prolonged inflation when deployed at a high altitude or at high air speeds. Thus the array of sensors for monitoring continuously variable parameters allows the payload and parachute airborne descent control apparatus to be utilized in a much wider spread of possible operating conditions than has been available heretofore.

The present invention is particularly usable with payloads such as space capsules which often make use of a plurality or cluster of parachutes which are all simultaneously attached with respect to the same payload, namely, the capsule. Substantial uneven load distributions in the multiple parachutes can result with the current commonly used reefing cutters that are mechanically activated and which have pyrotechnic fuses for setting time delay. The concept of the present invention is very useful for such applications because it can broadcast the disreefing signal to all canopies in a cluster in a coordinated manner to maintain balanced inflation of the respect canopies. The concept of the present invention is particularly useful for applications involving the use of clusters of parachutes because a single processor can be used to fully control the operation of sets of wireless transmitters and receivers associated with each individual parachute in the cluster.

Optimization of the setting of the pre-designated time delay is an important improvement made possible by the apparatus of the present invention. Pyrotechnic reefing cutters commonly used at this time are mechanically-actuated and, as such, provide only a limited selection of delay times and accuracies. Currently used electrically-actuated reefing cutters may have unlimited delay selection capabilities, but are constrained by the bulk and mass of the wiring that is required. These problems are overcome by the improved reefing control system of the present invention since an essentially unlimited variation in the pre-set reefing schedule timing is made possible. The only constraints on the operation of the improved design present herein is the basic accuracy of the processor and the response characteristics of the wireless transmitting and receiving hardware.

While particular embodiments of this invention have been shown in the drawing and described above, it will be apparent that many changes may be made in the form, arrangement, and positioning of the various elements of the combination. In consideration thereof, it should be understood that preferred embodiments of this invention disclosed herein are intended to be illustrative only and not intended to limit the scope of the invention.

We claim:

1. A method for parachute reefing control for use with a payload attached solely through suspension lines to a parachute having a canopy with a canopy reefing device and a reefing release mechanism for controlling canopy inflation and airborne descent after deployment thereof, said method comprising:
   A. providing a reefing control processor mounted on the payload which is preprogrammed with a release schedule for controlling release of the reefing of the parachute canopy;
   B. transmitting of at least one wireless release signal from the payload to the reefing release mechanism mounted adjacent the reefing device at the parachute canopy in accordance with the release schedule;
   C. receiving of the wireless release signal at a position adjacent the canopy; and
   D. actuating a reefing release mechanism positioned adjacent to the canopy to allow at least partial inflation of the parachute canopy to facilitate controlled descent thereof with the payload attached thereto
   E. monitoring a plurality of parameters with sensors mounted with respect to the payload and communicating the monitored parameter information to the reefing control processor; and
   F. modifying of the preprogrammed reefing release schedule by operation of the reefing control processor responsive to the monitored parameter information received from the sensors.

2. A method for parachute reefing control as defined in claim 1 wherein said transmitting of at least one wireless release signal comprises transmitting a plurality of separately identifiable release signals sequentially for actuating release of the reefed canopy in multiple stages from initially allowing only partial inflation thereof to full inflation thereof finally.

3. A method for parachute reefing control as defined in claim 1 wherein said monitoring includes monitoring the mission elapsed time.

4. A method for parachute reefing control as defined in claim 1 wherein said monitoring includes monitoring of the altitude of the payload from ground level therebelow.

5. A method for parachute reefing control as defined in claim 1 wherein said monitoring includes operating of a global positioning system device to instantaneously determine the position of the payload.

6. A method for parachute reefing control as defined in claim 1 wherein said monitoring includes monitoring the dynamic pressure being exerted instantaneously on the payload.

7. A method for parachute reefing control as defined in claim 1 wherein said monitoring includes instantaneously sensing the load force on the canopy.

8. A method for parachute reefing control as defined in claim 1 further comprising evaluating the monitored parameters instantaneously and selectively preventing initial deployment of the parachute and/or activation of a parachute reefing release mechanism responsive to determining that any one of the sensed parameters are currently at a value which is outside of predetermined or disreefing tolerance limiting values.

9. A method for parachute reefing control for use with a payload attached solely through suspension lines to a plurality of individual parachutes, each having an associated canopy with an associated canopy reefing device and an associated reefing release mechanism for controlling canopy inflation and airborne descent after deployment thereof, said method comprising:
   A. providing a reefing control processor mounted on the payload which is preprogrammed with a release schedule for controlling release of the reefing of each of the parachute canopies;
   B. transmitting of at least one wireless release signal from the payload to each reefing release mechanism mounted adjacent to each reefing device at the associated parachute canopy in accordance with the release schedule;
   C. receiving of the associated wireless release signal at a position adjacent each associated canopy; and
   D. actuating a reefing release mechanism positioned adjacent to each canopy to allow at least partial inflation of the associated parachute canopy to facilitate controlled descent thereof with the payload attached thereto and coordination of the inflation of each of individual parachute canopies.

* * * * *